United States Patent
Wu et al.

(10) Patent No.: US 8,305,055 B2
(45) Date of Patent: Nov. 6, 2012

(54) NON-INVERTING BUCK BOOST VOLTAGE CONVERTER

(75) Inventors: Xuelin Wu, Plano, TX (US);
Congzhong Huang, Plano, TX (US);
Michael M. Walters, Apex, NC (US)

(73) Assignee: Intersil Americas Inc., Milpitas, CA (US)

( * ) Notice: Subject to any disclaimer, the term of this patent is extended or adjusted under 35 U.S.C. 154(b) by 295 days.

(21) Appl. No.: 12/848,579

(22) Filed: Aug. 2, 2010

(65) Prior Publication Data
US 2011/0187336 A1   Aug. 4, 2011

Related U.S. Application Data

(60) Provisional application No. 61/299,511, filed on Jan. 29, 2010.

(51) Int. Cl.
*G05F 1/575* (2006.01)
*G05F 1/618* (2006.01)

(52) U.S. Cl. .......... 323/259; 323/283; 323/285
(58) Field of Classification Search .......... 323/225, 323/259, 268, 271, 282, 284, 285, 299, 344, 323/283
See application file for complete search history.

(56) References Cited

U.S. PATENT DOCUMENTS

| | | | | |
|---|---|---|---|---|
| 4,974,141 | A * | 11/1990 | Severinsky et al. | 363/81 |
| 7,288,924 | B2 * | 10/2007 | Trandafir et al. | 323/283 |
| 7,777,457 | B2 * | 8/2010 | Haiplik | 323/222 |

\* cited by examiner

*Primary Examiner* — Gary L Laxton
(74) *Attorney, Agent, or Firm* — Howison & Arnott, L.L.P.

(57) ABSTRACT

A non-inverting buck boost voltage converter includes a buck boost voltage regulation circuitry for generating a regulated output voltage responsive to an input voltage. A current sensor monitors an input current to the buck boost voltage regulation circuitry. Buck boost mode control circuitry controls the buck boost voltage regulation circuitry using peak current mode control in a buck mode of operation and valley current mode control in boost mode of operation responsive to the monitored input current.

22 Claims, 7 Drawing Sheets

NON-INVERTING BUCK BOOST VOLTAGE CONVERTER

CROSS-REFERENCE TO RELATED APPLICATIONS

This application claims priority to U.S. Provisional Application No. 61/299,511 entitled SYSTEM AND METHOD FOR NON-INVERTING BUCK BOOST CONVERTERS, filed Jan. 29, 2010, which is incorporated herein by reference.

BRIEF DESCRIPTION OF THE DRAWINGS

For a more complete understanding, reference is now made to the following description taken in conjunction with the accompanying Drawings in which.

DETAILED DESCRIPTION

Figure 1:
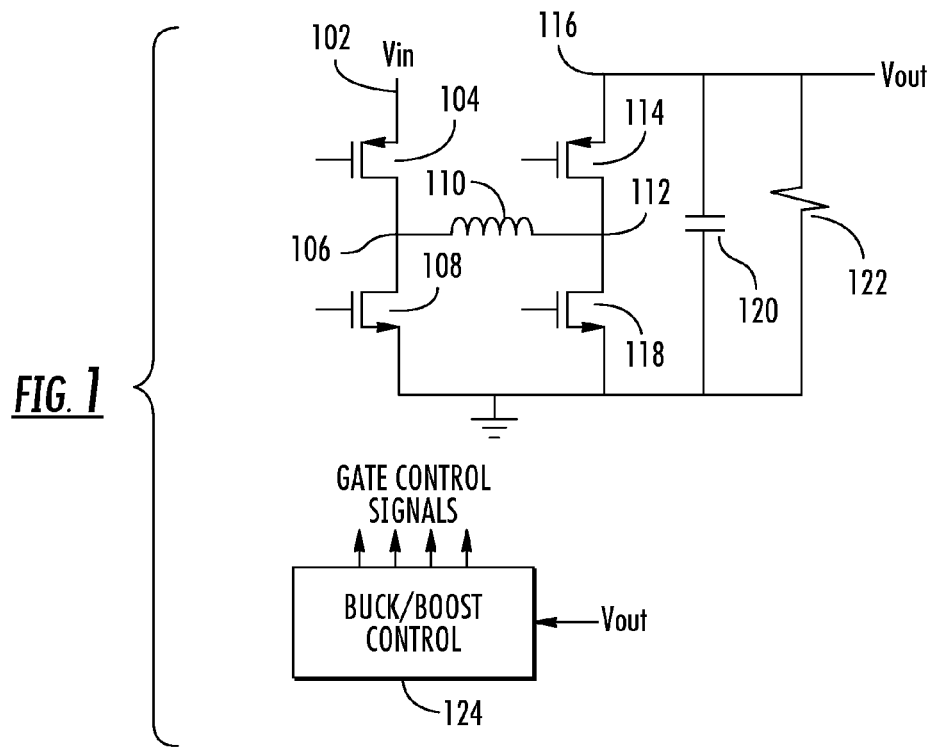
FIG. 1 is a schematic diagram of a buck boost converter.

Referring now to the drawings, wherein like reference numbers are used herein to designate like elements throughout, the various views and embodiments of a non-inverting buck boost voltage converter are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Non-inverting buck boost converters are capable of achieving a positive output voltage that is higher or lower than its input voltage. As battery powered devices are becoming more and more popular, this topology is becoming more attractive as it can make the use of the discharge cycles of a battery. When a battery input voltage is higher than its output voltage, a buck boost converter works in the buck mode of operation. In the buck mode of operation, the converter decreases the input voltage to the necessary level for use at its output. When the battery input voltage is lower than the output voltage, the buck boost converter works in the boost mode of operation wherein the input voltage is increased to a level needed at the output. It is relatively easy to implement the control in either a pure buck mode of operation or a pure boost mode of operation by leaving some power switches turned on or off. The challenge remains in the transition between the buck and boost modes of operation when the output voltage is close to the input voltage. There are two challenges to controlling the buck boost converter during this transition between buck and boost modes of operation. One challenge involves the line transient, which is a dynamic response. The other challenge is the output ripple wherein the generated input voltage is close to the output voltage which is a steady state performance issue.

The below described implementation comprises a scheme to control non-inverting buck boost converters and provide a method to achieve a smooth transition between modes and line transients while still maintaining minimum ripple voltage when the output voltage is close to the input voltage. Only one integrated current sensor is utilized in the scheme instead of multiple sensors to reduce the complexity and simplify the overall design. The controller uses a peak current mode control in the buck mode of operation and a valley current control mode in the boost mode of operation using cycle-by-cycle detection. This method provides smooth transitions and line transients within the converter. In the case when the output voltage is close to the input voltage, the buck boost converter switches from the buck mode of operation to the boost mode of operation or from the boost mode of operation to the buck mode of operation automatically by monitoring the maximum duty cycle. This simplifies the control of the buck boost converter and reduces the output voltage ripple. Both buck mode operations and boost mode operations use the same integrated current sensor which reduces the complexity of the system and increases the overall reliability.

Referring now to the drawings, and more particularly to FIG. 1, there is illustrated a schematic diagram of a buck boost converter. The buck boost converter includes an input voltage node 102 into which the input voltage $V_{IN}$ is applied. A high side buck transistor 104 comprises a P-channel transistor having its source/drain path connected between node 102 and node 106. A low side buck transistor 108 comprises an N-channel transistor having its drain/source path connected between node 106 and ground. An inductor 110 is connected between node 106 and node 112. A high side P-channel boost transistor 114 has its source/drain path connected between the output voltage node $V_{OUT}$ 116 and node 112. A low side boost transistor 118 comprises an N-channel transistor having its source/drain path connected between node 112 and ground. The output capacitance 120 is connected between the output voltage node 116 and ground. The output load resistance 122 is connected in parallel with the capacitance 120 between node 116 and ground. Each of the high side buck transistor 104, low side buck transistor 108, high side boost transistor 114 and low side boost transistor 118 have their gates connected to buck boost control circuitry 124. The buck boost control circuitry 124 generates gate control signals via a plurality of outputs using internal control logic that is responsible to at least the output voltage $V_{OUT}$ applied from node 116. The duty cycle in the buck mode of operation is defined as $D=t_{on(104)}/T$, where $t_{on}$ is the on-time of switching transistor 104 and T is the switching period of the converter. T is the inverse of the switching frequency, fsw, (T=1/fsw). During boost operation, the duty cycle is defined to be $D=t_{on(114)}/T$, i.e. the on-time of synchronous high side boost transistor 114 divided by the switching period.

Figure 2:
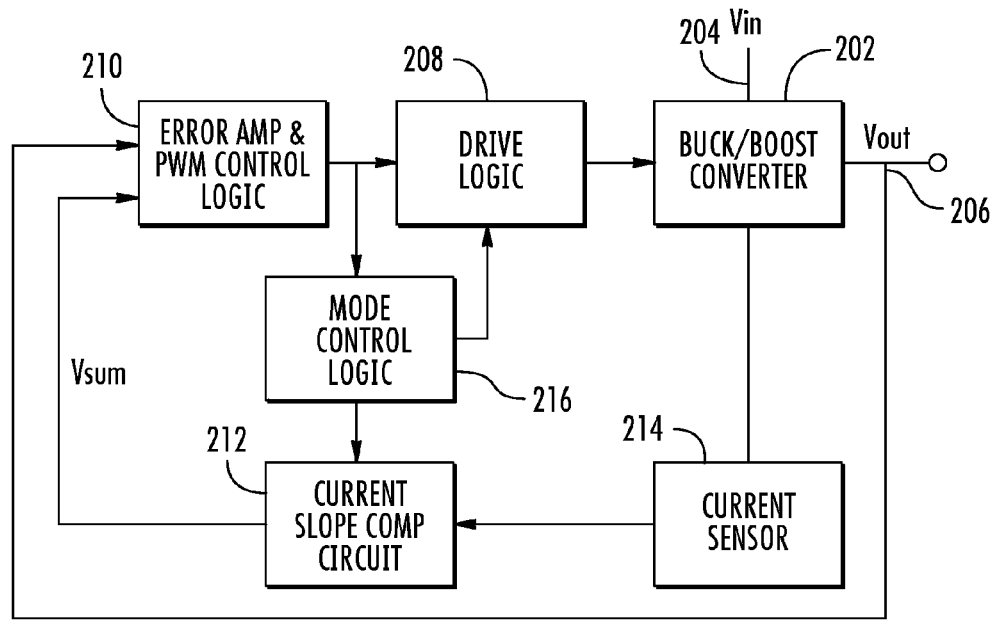
FIG. 2 illustrates a functional block diagram of the non-inverting buck boost converter of the present disclosure.

Referring now to FIG. 2, there is illustrated a functional block diagram of a non-inverting buck boost converter operating according to the present disclosure. The buck boost converter circuitry 202 receives the input voltage $V_{IN}$ at input node 204 and provides the output voltage $V_{OUT}$ at the node 206. Switching transistors within the buck boost converter 202 are driven according to drive control signals provided from drive logic 208. The drive logic 208 generates the drive control signals to the switching transistors responsive to PWM control signals provided from PWM control logic 210. The Error amplifier and PWM control logic 210 generates the PWM control signals responsive to the output voltage monitored at node 206 and also responsive to the current control voltage VSUM provided from current slope control compensation logic 212. The current slope control compensation logic generates the VSUM voltage to the Error amplifier and PWM control logic 210 responsive to a monitored current within the buck boost converter 202 provided by a current sensor 214 and mode control logic 216. The current sensor 214 measures the input current provided at the input node 204 of the buck boost converter 202. The mode control logic 216 determines whether the buck boost converter 202 is operating in the buck mode of operation or the boost mode of operation by monitoring the PWM signals provided from the PWM control logic 210. The mode control logic 216 additionally provides mode control signals to the drive logic 208 to control the operation of the switching transistors within the buck boost converter 202.

Figure 3:
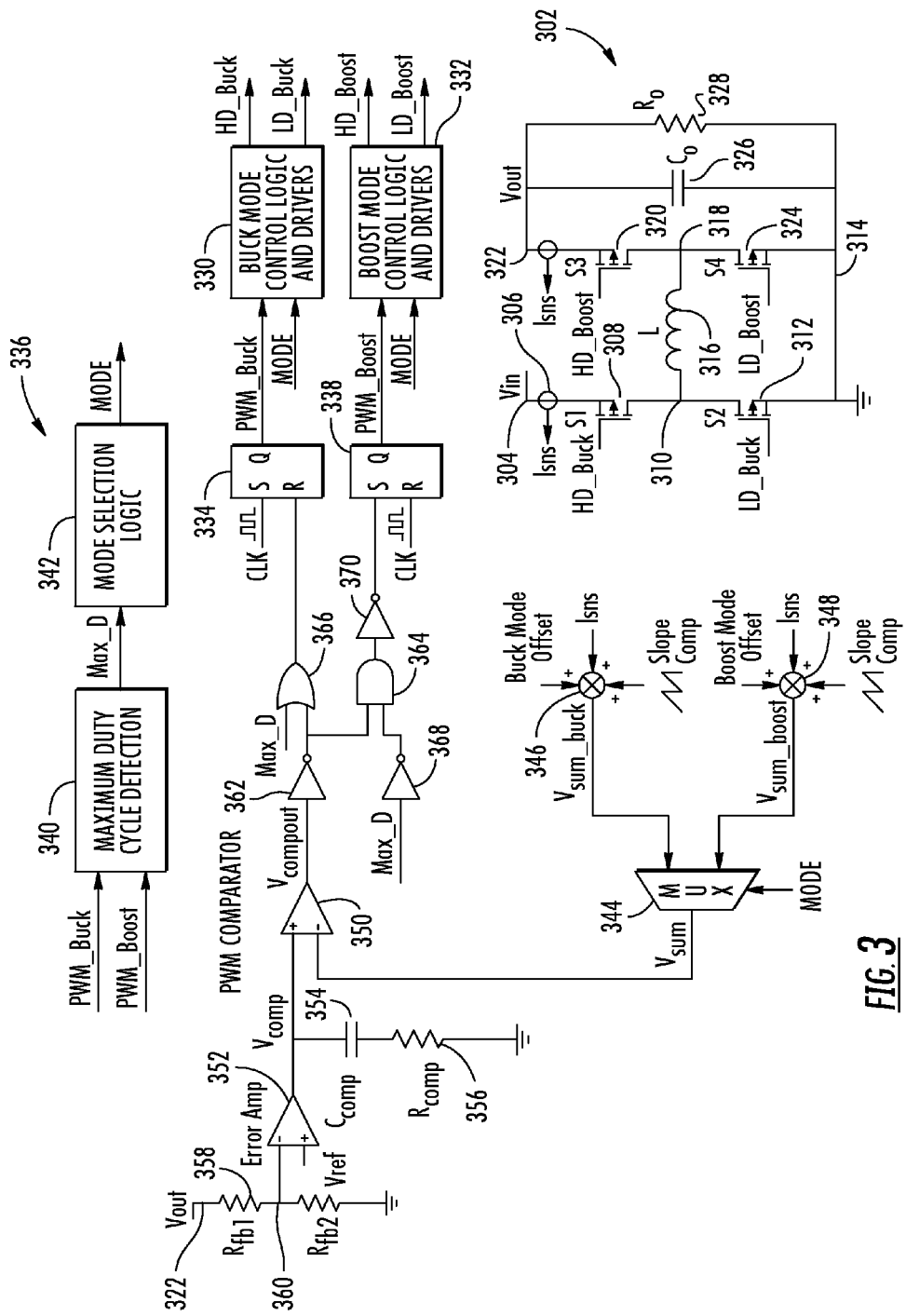
FIG. 3 provides a more detailed block diagram of the non-inverting buck boost converter of the present disclosure.

Referring now to FIG. 3, there is illustrated a block diagram of the non-inverting buck boost converter of the present disclosure. The buck boost converter 302 includes an input voltage node 304 to which the input voltage $V_{IN}$ is applied. A current sensor 306 senses the input voltage current through node 304 and provides a sensed input current ISNS. A high side buck transistor 308 is connected between the current sensor 306 and node 310. The high side buck transistor 308 comprises a P-channel transistor. The high side buck transistor 308 is connected to receive the drive signal HD_BUCK. A low side buck transistor 312 comprises a N-channel transistor having its drain/source path connected between node 310 and the ground node 314. The low side buck transistor 312 is connected to receive the drive control signal LD_BUCK. An inductor 316 is connected between node 310 and node 318.

A high side boost transistor 320 comprises a P-channel transistor having its source/drain path connected between the output voltage node $V_{OUT}$ 322 and node 318. The low side boost transistor 321 comprises an N-channel transistor having its drain/source path connected between node 318 and node 314. The gate of transistor 324 is connected to receive the drive control signal LD_BOOST. The gate of high side boost transistor 320 is connected to receive the drive control signal HD_BOOST. An output capacitor 326 is connected to the output voltage node 322 between the output voltage node 322 and the ground node 314. Additionally, a load 328 is connected in parallel with the output capacitance 326 between the output voltage node 322 and the ground node 314.

The drive control signals to each of the high side buck transistor 308, the low side buck transistor 312, the high side boost transistor 320 and the low side boost transistor 324 are provided from the buck mode current logic and drivers 330 and the boost mode control logic and drivers 332, respectively. The buck mode control logic and drivers 330 generate the HD_BUCK signal to the high side buck transistor 308 and the LD_BUCK signal to the low side buck transistor 312 responsive to a PWM signal (PWM_BUCK) provided from SR latch 334 and a mode control signal provided from the mode control logic 336. The boost mode control logic and drivers 332 generate the HD_BOOST drive signal to transistor 320 and the LD_BOOST drive signal to transistor 324 responsive to a PWM control signal (PWM_BOOST) from SR latch 338 and a mode control signal from the mode control logic 336. The transistors 308 and 312 are the power switches for the buck boost converter 302 in the buck mode of operation. In the buck mode of operation, transistor 320 is always turned on and transistor 324 is always turned off. Likewise, in the boost mode of operation, the buck mode control logic and drivers 330 and the boost mode control logic and drivers 332 control the boost transistors 320 and 324 to comprise the power FET switches. In the boost mode of operation the transistor 308 is always turned on while the transistor 312 off.

The SR latch 334 generates the buck PWM signal to the buck mode control logic and drivers 330 responsive to a clock signal provided at the S input of the SR latch 334 and a logic signal applied to the R input of the SR latch 334. The PWM signal PWM_Boost is provided from the Q output of SR latch 338 responsive to a clock input provided to the R input of the SR latch 338 and a logic input provided to the S input of SR latch 338.

The mode control logic 336 provides the MODE signal to each of the buck mode control logic and drivers 330 and the boost mode control logic and drivers 332. The mode control logic 336 generates the output control signal MODE to each of the buck mode control logic and drivers 330 and the boost mode control logic and drivers 332 responsive to the PWM_BUCK and PWM_BOOST signals provided from the outputs of SR latches 334 and 338, respectively. The maximum duty cycle detection circuit 340 determines when a maximum duty cycle condition exists between the buck and boost modes of operation responsive to the output voltage $V_{OUT}$ approaching the input voltage $V_{IN}$. When a maximum duty cycle condition is detected, the maximum duty cycle detection circuit 340 generates a logical "high" value for the MAX_D signal which is provided to the mode selection logic 342.

The mode selection logic 342 determines whether the buck boost converter 302 needs to switch to either the buck mode of operation or the boost mode of operation and generates a mode control signal MODE to indicate this change. In order to smoothly switch from buck operation to boost operation or from boost operation to buck operation, the determination of the maximum duty cycle is introduced into the control scheme by the maximum duty cycle detection circuit 340. Anytime a maximum duty cycle condition is detected the MAX_D signal goes to a logical "high" level. This normally occurs when the input voltage $V_{IN}$ is close to the output voltage $V_{OUT}$ or when load transients occur in the output. The mode selection logic 342 determines if the operation mode of the buck boost converter 302 is either buck or boost. A simple control method is implemented such that whenever a MAX_D logical "high" signal is detected, the operational mode is toggled. More sophisticated control methods can be applied by using multiple MAX_D signals. There are two, and only two modes operating within the buck boost converter either buck or boost. The output "MODE" signal of the mode selection logic acts like a multiplexer control signal to select the operational circuits, e.g., current sensing and switch driver control logic depending on whether the converter is in the buck or boost mode of operation. Thus, the MODE control signal selects either the buck mode control logic drivers 330 or the boost mode control logic and drivers 332 depending upon the mode of operation and also selects the current sensing compensation signal provided from the output of multiplexer 344.

The multiplexer 344 is connected to receive either the VSUM_BUCK signal or the VSUM_BOOST signal. The VSUM_BUCK signal comprises a summation of the sensed current from current sensor 306, a buck mode offset signal and a buck slope compensation signal which are added together at adder circuit 346. The VSUM_BOOST signal is generated at an adder circuit 348 by adding together the ISNS input current measurement from current sensor 306, a boost mode offset signal and a boost slope compensation signal. The sensed current ISNS from the current sensor 306 is summed with the buck mode offset or the boost mode offset to ensure that the error amplifier 352 is operating with a proper DC bias. The buck or boost compensation slope is added to the sensed current to avoid sub harmonic oscillation in large duty cycle operations. Each of the VSUM_BUCK and VSUM_BOOST compensation signals are provided to an input of the multiplexer 344. Depending on whether the buck boost converter 302 is operating in the buck mode of operation or the boost mode of operation either the VSUM_BUCK (buck mode) or the VSUM_BOOST (boost mode) are selected responsive to the MODE signal at the multiplexer 344 and the selected signal is provided as the output current compensation signal $V_{SUM}$.

The $V_{sum}$ signal is provided to the inverting input of a PWM comparator 350 from the multiplexer 344. The non-inverting input of the PWM comparator 350 is connected to receive the voltage error signal $V_{COMP}$ from an error amplifier 352. The output of the error amplifier 352 is connected to ground through a capacitor 354 in series with a resistor 356. The inverting input of the error amplifier 352 monitors the output voltage $V_{OUT}$ at node 322 through a resistor divider consisting of a resistor 358 connected between node 322 and node 360 and a resistor connected between node 360 and ground. The inverting input of error amplifier 352 is connected to node 360. The error amplifier 352 compares a reference voltage $V_{REF}$ applied at its non-inverting input to the output feedback voltage from the buck boost converter 302 to generate the error signal $V_{COMP}$. The $V_{COMP}$ signal is used to determine the inductor current through inductor 316 in both a peak current mode when the buck boost converter is operating in the buck mode of operation and a valley current mode when the buck boost converter is operating in the boost mode of operation. Buck operation and boost operation share the same voltage error signal. The comparison of $V_{SUM}$ from the output of multiplexer 344 to the voltage error signal $V_{COMP}$ determines the on/off state of the power transistors 308, 312, 320 and 324.

The output of the PWM comparator 350 ($V_{COMP\_out}$) is provided as an input to an inverter 362 and to a first input of AND gate 364. The inverted output from inverter 362 is provided to a first input of OR gate 366. The other input of OR gate 366 is connected to receive the MAX_D signal from the output of the maximum duty cycle detection circuitry 340. The output of the OR gate 366 provides the logic signal to the R input of latch 334 to enable generation of the buck PWM signal. The other input of AND gate 364 is connected to the output of an inverter 368. The input of inverter 368 is connected to receive the MAX_D signal from the maximum duty cycle protection circuit 340. The output of AND gate 364 is connected to another inverter 370. The output of the inverter 370 provides a logic signal to the S input of SR latch 338 to provide the boost PWM signal.

Figure 4:
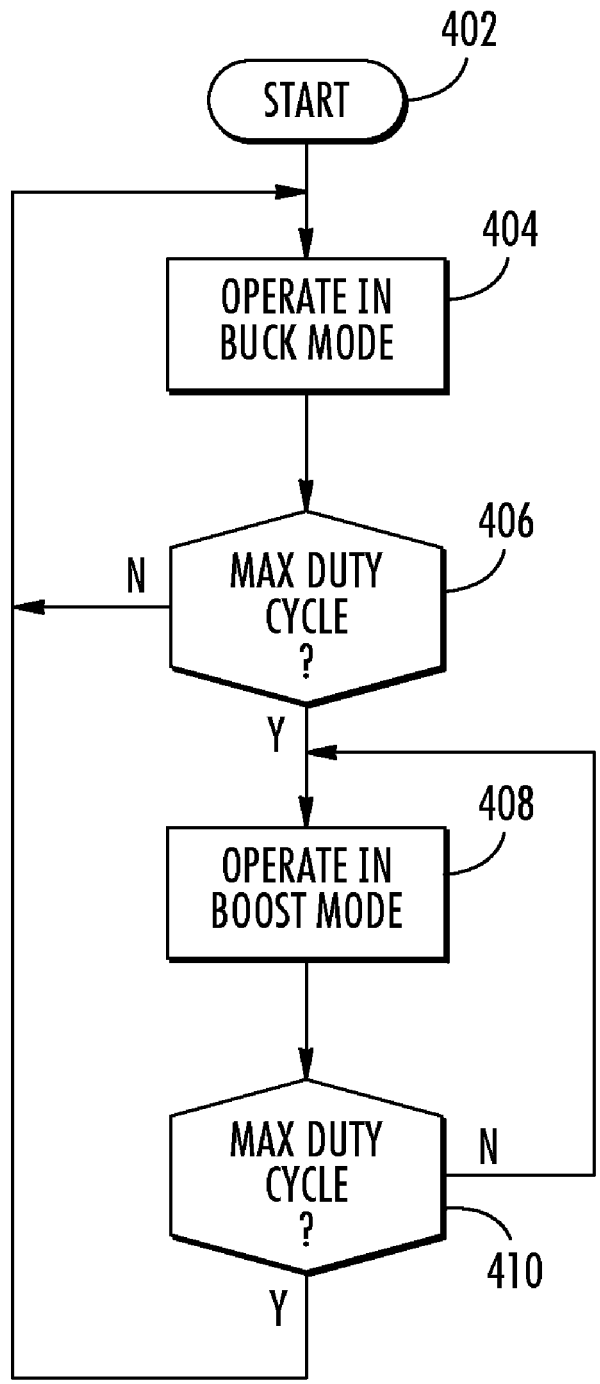
FIG. 4 is a flow diagram illustrating the operation of the non-inverting buck boost converter of FIG. 3.

Referring now to FIG. 4, there is illustrated a flow diagram describing the operation of the buck boost converter of FIG. 3. When the converter operation is initiated at step 402, the converter initially operates in the buck mode of operation at step 404 and is working in the peak current control mode of operation. Inquiry step 406 monitors for the maximum duty cycle and if the maximum duty cycle is not presently detected control passes back to step 404. When maximum duty cycle is detected, the converter enters the boost mode of operation at step 408 and operates using valley current control mode. Inquiry step 410 monitors for the maximum duty cycle and if the maximum duty cycle is not detected, control passes back to step 408. When the maximum duty cycle is detected, the converter converts back to operating in the buck mode of operation at step 404.

Figure 5A:
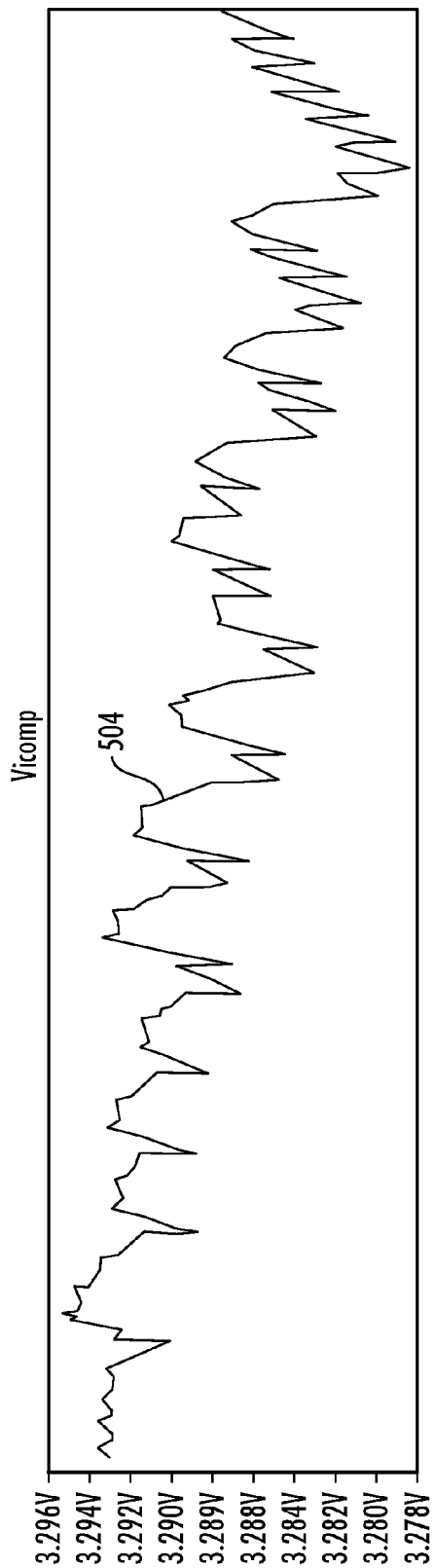
FIGS. 5a-5c illustrates the waveforms of the buck boost converter operation when converting from buck mode of operation to boost mode of operation.
Figure 5B:
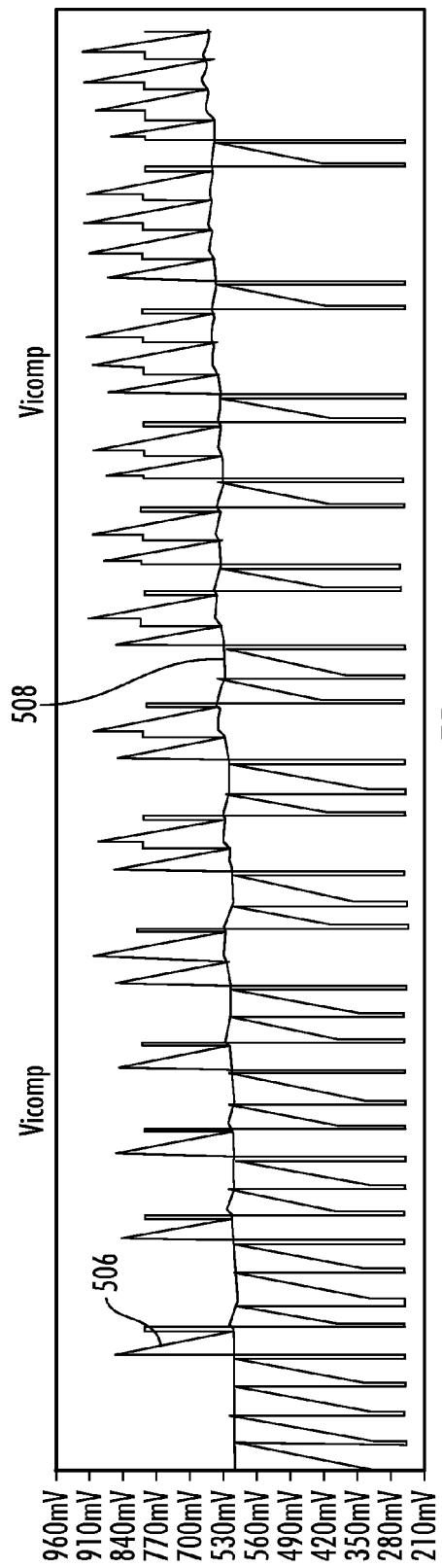
Figure 5C:
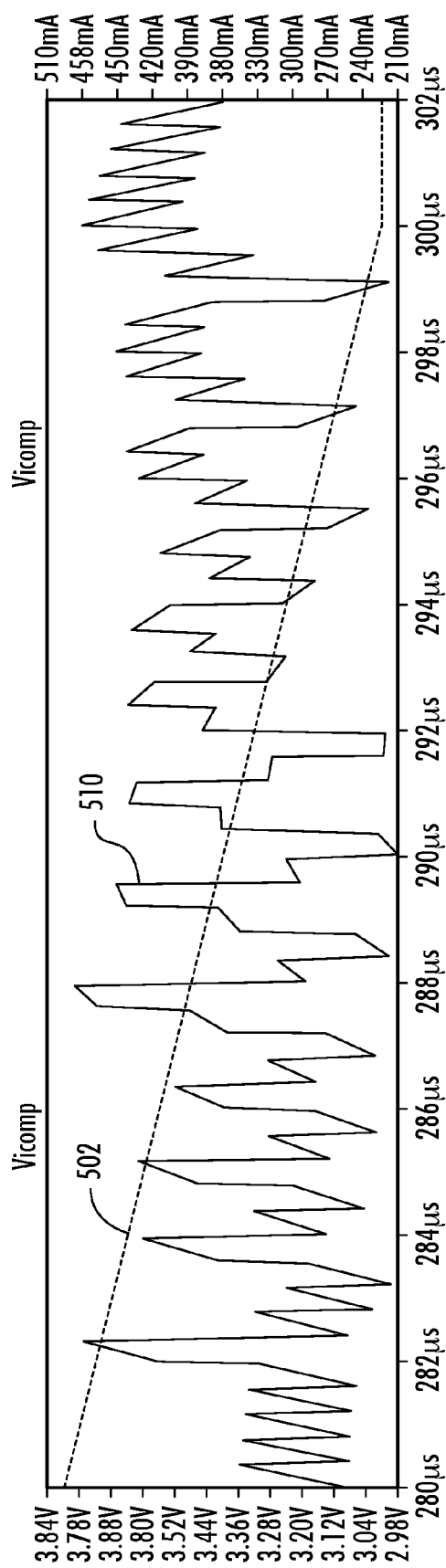

Referring now to FIG. 5, there are illustrated the various waveforms associated with the buck boost converter 302 when the buck boost converter transitions from the buck mode of operation to the boost mode of operation. Transistors 308 and 312 comprise the main power switches in the buck mode of operation. Transistor 320 is always on in the buck mode of operation and transistor 324 is always off in the buck mode of operation. As the input voltage $V_{IN}$ 502 drops, the switching duty cycle increases because D~Vout/Vin. As the input voltage $V_{IN}$ 502 drops to a certain value, the duty cycle reaches a maximum threshold (maximum duty cycle), the maximum duty cycle detection logic 340, which in one embodiment comprises a digital comparator, responds to this condition and sets the signal MAX_D to a logical "high" level. Simultaneously, the high side transistor 308 is turned off and the transistor 312 is turned on. The mode selection logic 342 knows the next cycle and when the clock signal appears at the input of the SR latch 334, the buck boost converter 302 will transition into boost mode. The control signal MODE is set to a logical "high" level (buck) when the clock pulse arrives, and the buck boost converter is now configured in boost operation. However, in this condition, the input voltage $V_{IN}$ 502 is still a bit higher than the output voltage $V_{OUT}$ 504 so that the boost mode of operation might be pumping too much energy into the load and further increasing the output voltage $V_{OUT}$. Thus, the buck boost converter 302 returns to the buck mode of operation after the boost cycle and remains in the buck mode of operation for more than one cycle until the output voltage $V_{OUT}$ 504 drops below the input voltage $V_{IN}$. As $V_{IN}$ 502 drops further, there will be more boost cycles. In this manner, a smooth transition from buck mode of operation to boost mode of operation is provided. FIG. 5 also illustrates the output of the multiplexer 344, $V_{SUM}$, the output of the error amplifier $V_{COMP}$ 508 and the inductor current 510.

Figure 6A:
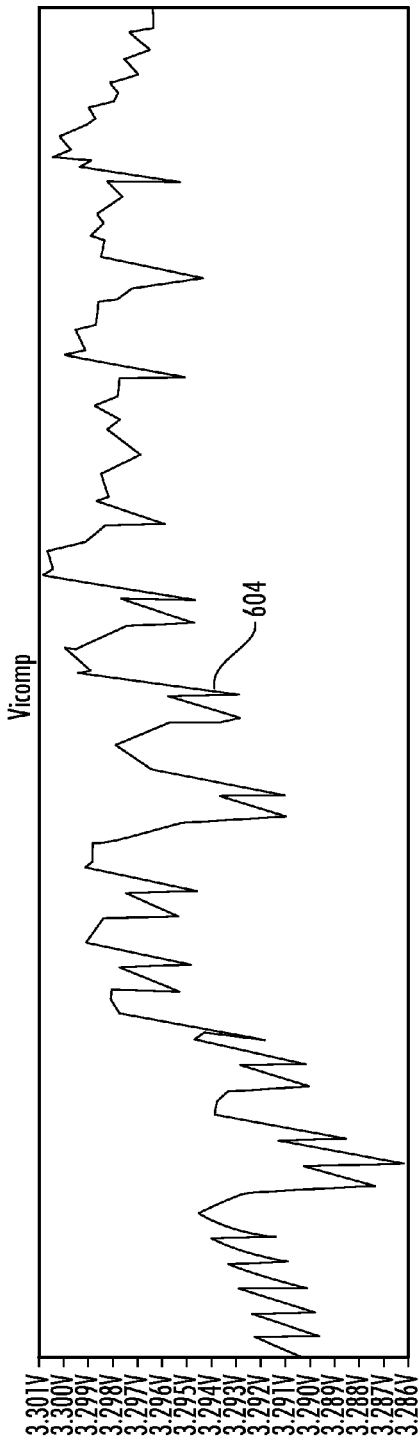
FIGS. 6a-6c illustrates the waveforms of the buck boost converter operation when converting from the boost mode of operation to the buck mode of operation.
Figure 6B:
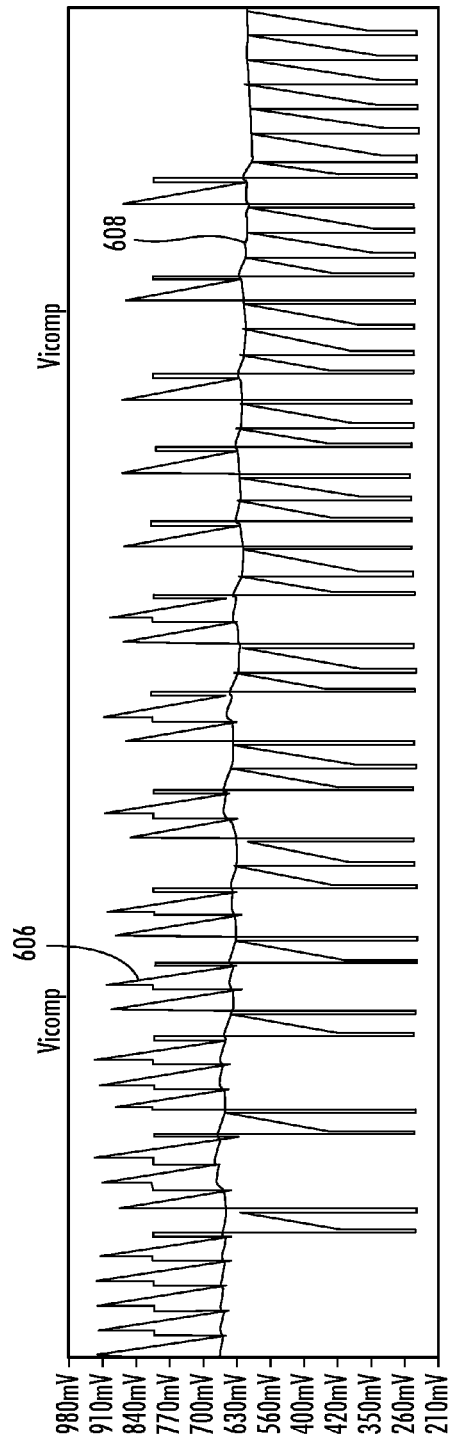
Figure 6C:
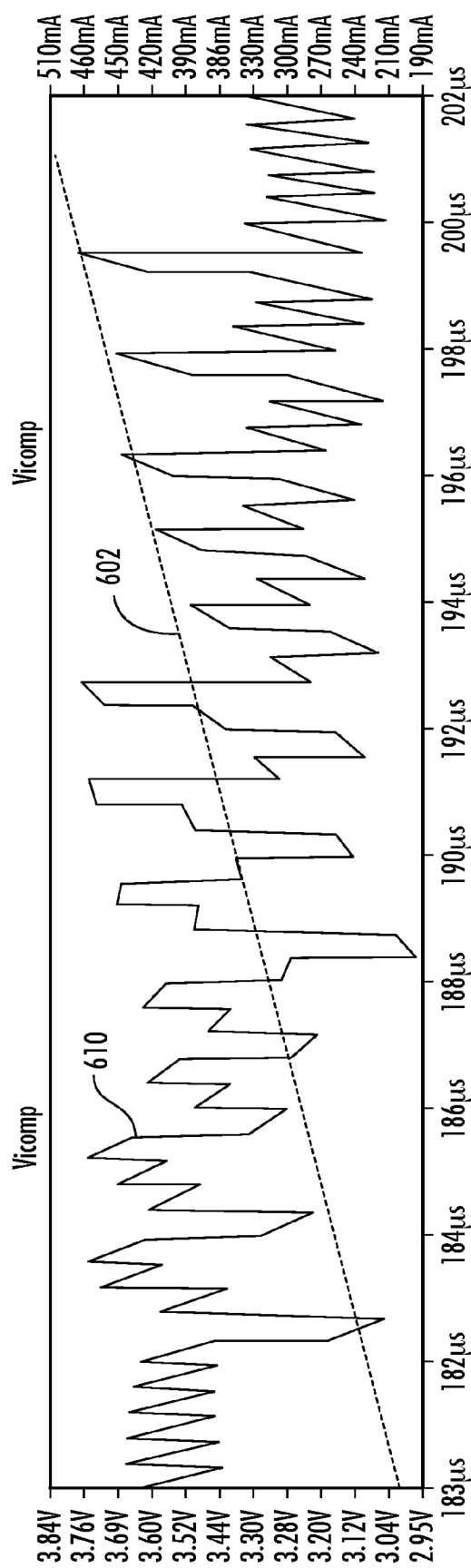

Referring now to FIG. 6, there is illustrated the conversion of the buck boost converter 302 from the boost mode of operation to the buck mode of operation. When the input voltage $V_{IN}$ 602 is much lower than the output voltage $V_{OUT}$ 604, the buck boost converter is running in a pure boost mode of operation. Transistors 320 and 324 comprise the main power switches in the boost mode of operation while transistor 308 is always on and transistor 312 is always off. As the input voltage $V_{IN}$ 602 increases, the switching duty cycles are increasing because the buck boost converter 302 is in the valley control mode of operation. As the input voltage $V_{IN}$ 602 increases to a certain level that the duty cycle reaches a maximum threshold level (maximum duty cycle), the maximum duty cycle detection logic 340, which comprises a digital comparator, responds to this condition and sets the signal MAX_D to a logical "high" level. Simultaneously, the high side transistor 320 is turned off and low side transistor 324 is turned on. The mode selection logic 342 knows the next cycle, when a clock signal appears, the converter will transmit into boost mode. The signal "MODE" is set to a logical "low" level (boost mode) when the clock signal arrives and the entire buck boost converter is configured in buck mode of operation. However, in this condition, the input voltage $V_{IN}$ 602 is still lower than the output voltage $V_{OUT}$ 604. Thus, the buck mode of operation may be pulling too much energy to the load and the output voltage $V_{OUT}$ 604 decreases. Thus, the buck boost converter 302 returns to the boost mode of operation after the buck cycle and remains in the boost mode of operation for more than one cycle until the output voltage 604 increases. As the input voltage $V_{IN}$ 602 increases further, there may be more buck cycles. In this manner, a smooth transition from boost to buck is provided.

The illustration of FIG. 6 further illustrates the output of the multiplexer 314 $V_{SUM}$ 606, the error voltage output $V_{COMP}$ 608 and the inductor current 610.

When the output voltage $V_{OUT}$ is close to the input voltage $V_{IN}$, the buck boost converter 302 is switching from buck to boost and boost to buck mode. There is no independent buck-boost mode just buck mode and boost mode. The control method makes sure of the smooth transition by using peak current control mode in the buck mode of operation and valley current control mode in the boost mode of operation. A major advantage of this method is that the error signal $V_{COMP}$ does not have any abrupt changes during the mode transition. Since the $V_{COMP}$ signal is a direct function of the output voltage $V_{OUT}$, if the error signal $V_{COMP}$ is stable the output voltage $V_{OUT}$ is stable. As previously stated, the output of the multiplexer $V_{SUM}$ is the sum of the input current ISNS, the buck or boost mode offset and a slope compensation signal. The different values of offsets in the buck and boost modes of operation are selected based upon the maximum slope compensation in a full cycle. Usually the different value of the offsets is twice the maximum slope compensation voltage. For example, if the slope compensation is 1V/us and the switching frequency is 1 MHz, the different value of the offsets are 1V/us*1 us*2, which is 2V. So if the offset in buck mode is Vos, then the offset for the boost mode is Vos+2V). A system operating in this manner provides line transients that are superior in both light loading and heavy loading conditions. The voltage ripple is also small when the output voltage is close to the input voltage. Control method is simple requiring only a single integrated current sensor and cycle-by-cycle detection.

It will be appreciated by those skilled in the art having the benefit of this disclosure that this non-inverting buck boost voltage converter provides for improved operation when transitioning between buck and boost modes of operation. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A non-inverting buck boost voltage converter, comprising:
    a buck boost voltage regulation circuitry for generating a regulated output voltage responsive to an input voltage;
    a current sensor for monitoring an input current to the buck boost voltage regulation circuitry;
    PWM control logic for generating a buck PWM control signal and a boost PWM control signal responsive to a maximum duty cycle detection signal, an error voltage and a compensation voltage responsive to the monitored input current; and
    buck mode control and drive circuitry for generating a high side buck switching transistor control signal and a low side buck switching transistor control signal responsive to the buck PWM control signal and a mode signal.

2. The non-inverting buck boost voltage converter of claim 1, wherein the buck boost mode control circuitry further comprises:
    boost mode control and drive circuitry for generating a high side boost switching transistor control signal and a low side boost switching transistor control signal responsive to the boost PWM control signal and the mode signal; and
    mode control logic for generating the maximum duty cycle detection signal and the mode signal responsive to the buck PWM control signal and the boost PWM control signal.

3. The non-inverting buck boost voltage converter of claim 2, further including an error amplifier for generating the error voltage responsive to the regulated output voltage and a reference voltage.

4. The non-inverting buck boost voltage converter of claim 2, further including current controlled compensation circuitry for generating the compensation voltage, wherein responsive to the mode signal in a first state, the compensation signal comprises the monitored input current, a buck mode offset signal and a buck mode slope compensation signal and responsive to the mode signal in a second state, the compensation signal comprises the monitored input current, a boost mode offset signal and a boost mode slope compensation signal.

5. The non-inverting buck boost voltage converter of claim 4, wherein the current controlled compensation circuitry further comprises:
    a first adder for adding the monitored input current, the buck mode offset signal and the buck mode slope compensation signal to generate a buck voltage compensation signal;
    a second adder for adding the monitored input current, the boost mode offset signal and the boost mode slope compensation signal to generate a boost voltage compensation signal; and
    a multiplexer for selecting between the buck voltage compensation signal and the boost voltage compensation signal as the voltage compensation signal responsive to the mode signal.

6. The non-inverting buck boost voltage converter of claim 2, wherein the mode control logic further comprises:
    maximum duty cycle detection circuitry for detecting a maximum duty cycle condition responsive to the buck PWM signal and the boost PWM signal and generating the maximum duty cycle detection signal; and
    mode selection circuitry for generating the mode signal indicating operation in one of the boost mode of operation and the buck mode of operation responsive to the maximum duty cycle detection signal.

7. The non-inverting buck boost voltage converter of claim 2, wherein the buck boost voltage regulation circuitry further includes:
    a high side buck switching transistor;
    a low side buck switching transistor;
    a high side boost switching transistor;
    a low side boost switching transistor;
    wherein in the buck mode of operation the high side boost switching transistor in turned on and the low side boost switching transistor is turned off responsive to the high side boost switching transistor control signal and the low side boost switching transistor control signal and the high side buck switching transistor and the low side buck switching transistor are selectively switched responsive to the high side buck switching transistor control signal and the low side buck switching transistor control signal; and
    wherein in the boost mode of operation the high side buck switching transistor in turned on and the low side buck switching transistor is turned off responsive to the high side buck switching transistor control signal and the low side buck switching transistor control signal and the high side boost switching transistor and the low side boost switching transistor are selectively switched responsive to the high side boost switching transistor control signal and the low side boost switching transistor control signal.

8. The non-inverting buck boost voltage converter of claim 2, wherein the PWM control logic further comprises:
a PWM comparator for comparing the error voltage with the compensation voltage and generating a first PWM signal responsive thereto;
second PWM control logic for generating a second PWM signal and a third PWM signal responsive to the first PWM signal and the maximum duty cycle detection signal;
a first latch for generating the buck PWM control signal responsive to the second PWM signal and a clock signal; and
a second latch for generating the boost PWM control signal responsive to the third PWM signal and the clock signal.

9. The non-inverting buck boost voltage converter of claim 2, wherein the PWM control logic further comprises:
a PWM comparator for comparing the error voltage with the compensation voltage and generating a PWM signal responsive thereto;
PWM control logic for generating a first PWM signal and a second PWM signal responsive to the PWM signal and the maximum duty cycle detection signal;
a first latch for generating the buck PWM control signal responsive to the first PWM signal and a clock signal; and
a second latch for generating the boost PWM control signal responsive to the second PWM signal and the clock signal.

10. A non-inverting buck boost voltage converter, comprising:
a buck boost voltage regulation circuitry for generating a regulated output voltage responsive to an input voltage;
a current sensor for monitoring an input current to the buck boost voltage regulation circuitry;
PWM control logic for generating a buck PWM control signal and a boost PWM control signal responsive to a maximum duty cycle detection signal, an error voltage and a compensation voltage;
buck mode control and drive circuitry for generating a high side buck switching transistor control signal and a low side buck switching transistor control signal responsive to the buck PWM control signal and a mode signal;
boost mode control and drive circuitry for generating a high side boost switching transistor control signal and a low side boost switching transistor control signal responsive to the boost PWM control signal and the mode signal;
mode control logic for generating the maximum duty cycle detection signal and the mode signal responsive to the buck PWM control signal and the boost PWM control signal;
current controlled compensation circuitry for generating the compensation voltage, wherein responsive to the mode signal in a first state, the compensation signal comprises the monitored input current, a buck mode offset signal and a buck mode slope compensation signal and responsive to the mode signal in a second state, the compensation signal comprises the monitored input current, a boost mode offset signal and a boost mode slope compensation signal.

11. The non-inverting buck boost voltage converter of claim 10, further including an error amplifier for generating the error voltage responsive to the regulated output voltage and a reference voltage.

12. The non-inverting buck boost voltage converter of claim 10, wherein the current controlled compensation circuitry further comprises:
a first adder for adding the monitored input current, the buck mode offset signal and the buck mode slope compensation signal to generate a buck voltage compensation signal;
a second adder for adding the monitored input current, the boost mode offset signal and the boost mode slope compensation signal to generate a boost voltage compensation signal;
a multiplexer for selecting between the buck voltage compensation signal and the boost voltage compensation signal as the voltage compensation signal responsive to the mode signal.

13. The non-inverting buck boost voltage converter of claim 10, wherein the mode control logic further comprises:
maximum duty cycle detection circuitry for detecting a maximum duty cycle condition responsive to the buck PWM signal and the boost PWM signal and generating the maximum duty cycle detection signal; and
mode selection circuitry for generating the mode signal indicating operation in one of the boost mode of operation and the buck mode of operation responsive to the maximum duty cycle detection signal.

14. The non-inverting buck boost voltage converter of claim 10, wherein the buck boost voltage regulation circuitry further includes:
a high side buck switching transistor;
a low side buck switching transistor;
a high side boost switching transistor;
a low side boost switching transistor;
wherein in the buck mode of operation the high side boost switching transistor in turned on and the low side boost switching transistor is turned off responsive to the high side boost switching transistor control signal and the low side boost switching transistor control signal and the high side buck switching transistor and the low side buck switching transistor are selectively switched responsive to the high side buck switching transistor control signal and the low side buck switching transistor control signal; and
wherein in the boost mode of operation the high side buck switching transistor in turned on and the low side buck switching transistor is turned off responsive to the high side buck switching transistor control signal and the low side buck switching transistor control signal and the high side boost switching transistor and the low side boost switching transistor are selectively switched responsive to the high side boost switching transistor control signal and the low side boost switching transistor control signal.

15. The non-inverting buck boost voltage converter of claim 10, wherein the PWM control logic further comprises:
a PWM comparator for comparing the error voltage with the compensation voltage and generating a first PWM signal responsive thereto;
PWM control logic for generating a second PWM signal and a third PWM signal responsive to the first PWM signal and the maximum duty cycle detection signal;
a first latch for generating the buck PWM control signal responsive to the second PWM signal and a clock signal; and
a second latch for generating the boost PWM control signal responsive to the third PWM signal and the clock signal.

16. A method for controlling a non-inverting buck boost voltage converter, comprising the steps of:
  generating a regulated output voltage responsive to an input voltage;
  monitoring an input current to the non-inverting buck boost voltage regulation circuitry;
  controlling the non-inverting buck boost voltage regulation circuitry using peak current mode control in a buck mode of operation responsive to the monitored input current, wherein the step of controlling in a buck mode of operation further include the steps of:
    generating a buck PWM control signal responsive to a maximum duty cycle detection signal, an error voltage and a compensation voltage; and
    generating a high side buck switching transistor control signal and a low side buck switching transistor control signal responsive to the buck PWM control signal and a mode signal; and
  controlling the non-inverting buck boost voltage regulation circuitry using a valley current mode control in a boost mode of operation responsive to the monitored input current.

17. The method of claim 16, wherein the steps of controlling in a boost mode of operation further include the steps of:
  generating a buck PWM control signal responsive to a maximum duty cycle detection signal, an error voltage and a compensation voltage;
  generating a high side boost switching transistor control signal and a low side boost switching transistor control signal responsive to the boost PWM control signal and the mode signal; and
  generating the maximum duty cycle detection signal and the mode signal responsive to the buck PWM control signal and the boost PWM control signal.

18. The method of claim 17, further including the step of generating the error voltage responsive to the regulated output voltage and a reference voltage.

19. The method of claim 17, further including the step of generating the compensation voltage, wherein responsive to the mode signal in a first state, the compensation signal comprises the monitored input current, a buck mode offset signal and a buck mode slope compensation signal and responsive to the mode signal in a second state, the compensation signal comprises the monitored input current, a boost mode offset signal and a boost mode slope compensation signal.

20. The method of claim 19, wherein the step of generating the compensation voltage further comprises the steps of:
  adding the monitored input current, the buck mode offset signal and the buck mode slope compensation signal to generate a buck voltage compensation signal;
  adding the monitored input current, the boost mode offset signal and the boost mode slope compensation signal to generate a boost voltage compensation signal;
  selecting between the buck voltage compensation signal and the boost voltage compensation signal as the voltage compensation signal responsive to the first state or the second state of the mode signal.

21. The method of claim 17, wherein the generating the maximum duty cycle detection signal and the mode signal further comprises the steps of:
  detecting a maximum duty cycle condition responsive to the buck PWM signal and the boost PWM signal;
  generating the maximum duty cycle detection signal responsive to the detected maximum duty cycle condition; and
  generating the mode signal indicating operation in one of the boost mode of operation and the buck mode of operation responsive to the maximum duty cycle detection signal.

22. The method of claim 17, wherein the steps of generating the buck PWM control signal and the boost PWM control signal further comprises the steps of:
  comparing the error voltage with the compensation voltage and generating a PWM signal responsive thereto;
  generating a first PWM signal and a second PWM signal responsive to the PWM signal and the maximum duty cycle detection signal;
  generating the buck PWM control signal responsive to the first PWM signal and a clock signal; and
  a second latch for generating the boost PWM control signal responsive to the second PWM signal and the clock signal.

* * * * *